(12) United States Patent
Cheng

(10) Patent No.: US 10,910,369 B2
(45) Date of Patent: Feb. 2, 2021

(54) ON-CHIP SECURITY CIRCUIT

(71) Applicant: International Business Machines Corporation, Armonk, NY (US)

(72) Inventor: Kangguo Cheng, Schenectady, NY (US)

(73) Assignee: International Business Machines Corporation, Armonk, NY (US)

(*) Notice: Subject to any disclaimer, the term of this patent is extended or adjusted under 35 U.S.C. 154(b) by 66 days.

(21) Appl. No.: 16/299,255

(22) Filed: Mar. 12, 2019

(65) Prior Publication Data

US 2020/0294997 A1 Sep. 17, 2020

(51) Int. Cl.
| | |
|---|---|
| *H01L 27/088* | (2006.01) |
| *H01L 21/8234* | (2006.01) |
| *H01L 23/00* | (2006.01) |
| *H01L 27/02* | (2006.01) |
| *H01L 29/78* | (2006.01) |

(52) U.S. Cl.
CPC .. *H01L 27/0886* (2013.01); *H01L 21/823418* (2013.01); *H01L 23/573* (2013.01); *H01L 27/0207* (2013.01); *H01L 29/785* (2013.01)

(58) Field of Classification Search
CPC ........... H01L 21/823418; H01L 23/573; H01L 27/0207; H01L 27/0886; H01L 29/785
See application file for complete search history.

(56) References Cited

U.S. PATENT DOCUMENTS

| | | | | |
|---|---|---|---|---|
| 8,610,454 B2* | 12/2013 | Plusquellic | ........... | H04L 9/0861 |
| | | | | 326/8 |
| 9,218,477 B2* | 12/2015 | Lewis | ...................... | G06F 21/44 |
| 9,391,030 B1 | 7/2016 | Li et al. | | |
| 9,666,582 B1* | 5/2017 | Li | .................. | H01L 21/823418 |
| 2018/0013431 A1* | 1/2018 | Bury | ........................ | G09C 1/00 |
| 2018/0218977 A1* | 8/2018 | Chang | .................... | G11C 17/16 |
| 2018/0277198 A1 | 9/2018 | Tseng et al. | | |

FOREIGN PATENT DOCUMENTS

EP     3059863 A1     8/2016

\* cited by examiner

*Primary Examiner* — Kurtis R Bahr
(74) *Attorney, Agent, or Firm* — Scully, Scott, Murphy & Presser, P.C.; L. Jeffrey Kelly

(57) ABSTRACT

Methods and system of generating a code are described. A device can receive a request to generate a code. The device can select a set of cells among a plurality of cells. The device can determine current through the selected cells in a forward mode. The device can determine current through the selected cells in a reverse mode. The device can determine a set of differences between the currents of the forward mode and the reverse mode. The set of differences corresponds to the set of selected cells. The device can transform the set of differences into the code. The device can output the code to respond to the request.

20 Claims, 8 Drawing Sheets

ON-CHIP SECURITY CIRCUIT

BACKGROUND

The present application relates generally to computer chip security. In one aspect, the present application relates more particularly to circuitry operable to generate security code for security applications, systems, and/or devices.

A unique code can be used for various computer-related security applications. For example, counterfeit chips can pose serious security threats to electronic devices, particularly in the era of exploding growth of Internet of thing (IoT) applications. One common approach to prevent counterfeits is to assign a unique code to each chip so that the authenticity of each chip can be verified when needed. Other security applications that use unique code may include data security and cryptographic applications.

SUMMARY

In some examples, a method of generating a code is generally described. The method includes receiving a request to generate a code. The method can further include selecting a set of cells among a plurality of cells. The method can further include determining current through the selected cells in a forward mode. The method can further include determining current through the selected cells in a reverse mode. The method can further include determining a set of differences between the currents of the forward mode and the reverse mode. The set of differences corresponds to the set of selected cells. The method can further include transforming the set of differences into the code. The method can further include outputting the code to respond to the request.

In some examples, a device effective to generate a code is generally described. The device can include a plurality of cells. The device can further include a set of decoders coupled to the plurality of cells. The set of decoders are operable to select a set of cells among the plurality of cells. The device can further include a circuitry coupled to the plurality of cells. The circuitry is operable to determine current through the selected cells in a forward mode. The circuitry is further operable to determine current through the selected cells in a reverse mode. The circuitry is further operable to determine a set of differences between the currents of the forward mode and the reverse mode. The set of differences corresponds to the set of selected cells. The circuitry is further operable to transform the set of differences into a set of bit values. The circuitry is further operable to output the set of bit values as a bit stream.

In some examples, a system effective to generate a code is generally described. The system includes a processor configured to receive a request to generate a code. The system further includes a device configured to be in communication with the processor. The device includes a plurality of cells. The device further includes a set of decoders coupled to the plurality of cells. The set of decoders are operable to select a set of cells among the plurality of cells. The device further includes a circuitry coupled to the plurality of cells. The circuitry is operable to determine current through the selected cells in a forward mode. The circuitry is further operable to determine current through the selected cells in a reverse mode. The circuitry is further operable to determine a set of differences between the currents of the forward mode and the reverse mode. The set of differences corresponds to the set of selected cells. The circuitry is further operable to transform the set of differences into the code. The circuitry is further operable to output the code to the processor.

Further features as well as the structure and operation of various embodiments are described in detail below with reference to the accompanying drawings. In the drawings, like reference numbers indicate identical or functionally similar elements.

DETAILED DESCRIPTION

Some example approaches to form an on-chip authentication code may include using electrical fuse (eFuse) or embedded flash memory (eFlash). In examples where state-of-the-art complementary metal-oxide-semiconductor (CMOS) uses a high-k/metal gate, the eFuse approach may require additional processing steps. Further, the eFlash approach typically requires additional processing steps when compared to eFuse approaches. Furthermore, programming eFuse and/or eFlash devices typically require high voltage which may be incompatible with a low voltage CMOS.

To be further described below, methods, devices, and systems are described for forming an on-chip unique code that can be compatible with vertical field effect transistors (VFETs) being pursued as a CMOS architecture beyond 7 nm node. In VFETs, the source-drain current flows in a direction normal to the substrate surface. In such devices, a vertical semiconductor pillar (or fin) defines the channel with the source and drain located at opposing ends of the semiconductor pillar. In VFET fabrication, the bottom source/drain (S/D) and top S/D are formed in separate processing steps. The bottom S/D is formed at an early stage of the process, while the top S/D is formed in a later stage of the process. As a result, the top S/D and bottom S/D experience different processes and/or thermal budgets, leading to asymmetry of VFETs. This is in contrast to conventional lateral FETs in which source and drain are symmetric.

In some examples, the asymmetry of a VFET is undesired to most CMOS applications and can be minimized for typical CMOS applications. Nevertheless, the asymmetry of a VFET cannot be totally eliminated. In some examples, with an optimized VFET CMOS flow, the asymmetry becomes random. For example, some VFETs may have higher resistance at top S/D side whereas other VFETs may have higher resistance at the bottom S/D side. The methods, devices and systems to be described in accordance with the present disclosure uses the asymmetry of VFETs to form unique on-chip codes. Thus, devices that already include VFETs may utilize the asymmetry of existing VFETs to generate secure and unique codes for various security applications. Further, devices that do not include VFETs may be integrated with a chip or device including an array of VFETs to generate secure and unique codes for various security applications as well.

Figure 1:
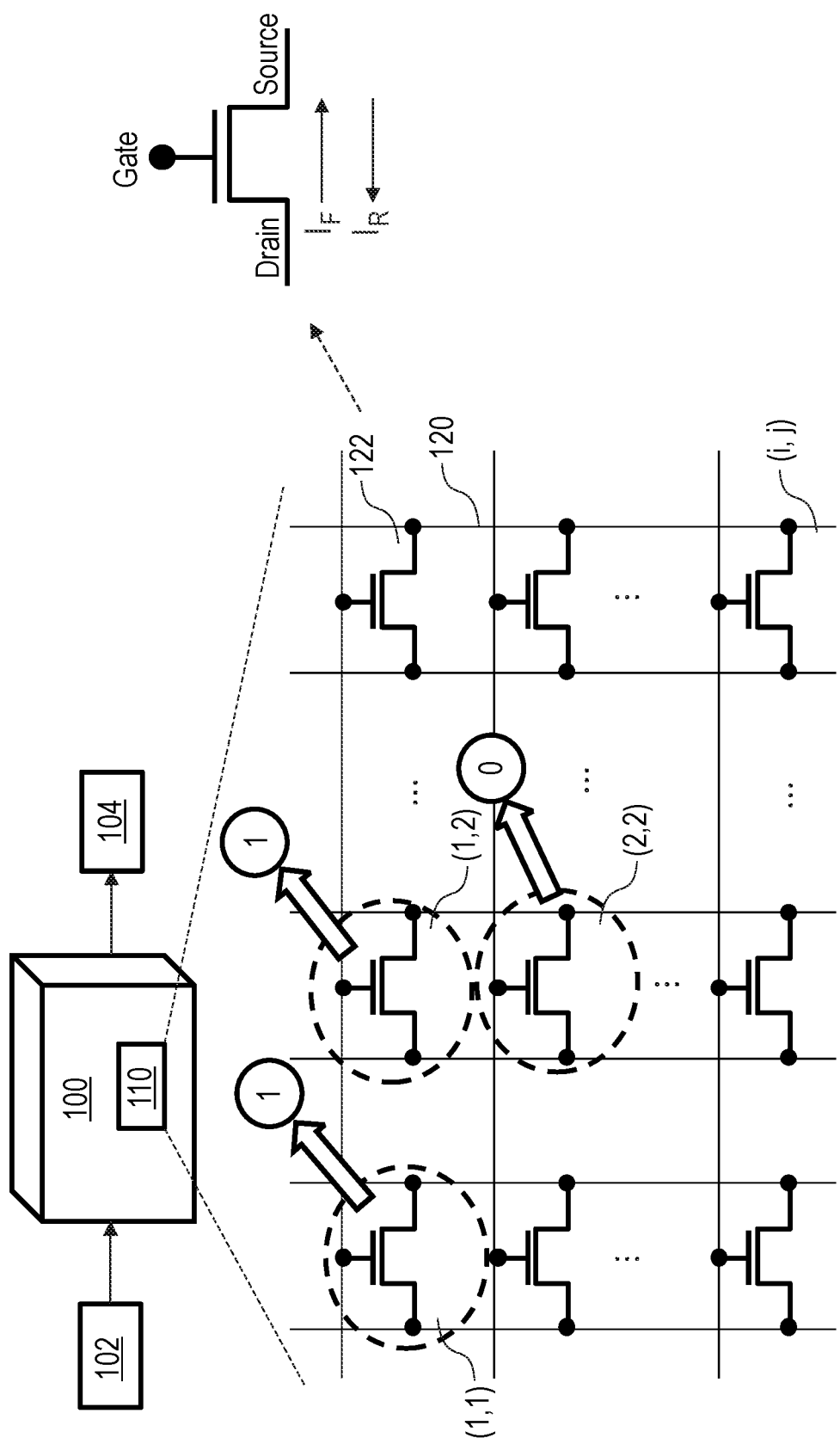
FIG. 1 is a diagram showing an example system including an on-chip security circuit in one embodiment.

FIG. 1 is a diagram showing an example system including an on-chip security circuit in one embodiment of the present application. In the embodiment illustrated in FIG. 1, a computer system (or system) 100 may include a device 110 (e.g., an on-chip security circuit), where the device 110 may be a computer chip including one or more circuitry. In some examples, the device 110 may be a part of the system 100. In some examples, the device 110 may be a chip or a module integrated or embedded into hardware components (e.g., a processor) of the system 100. In some examples, the system 100 may be implemented by a computer device such as, for example, a desktop computer, a laptop computer, a server, an application-specific integrated circuit (ASIC), an application-specific instruction set processor (ASIP), and/or other types of computer devices. The system 100 may include hardware components such as, for example, circuits, hardware processors, memory devices configured to perform operations associated with the methods described in accordance with the present disclosure.

In some example, the system 100 may receive a request 102 from a user of the system 100 and/or from a device external to the system 100. For example, a user can use input devices such as, for example, keyboard, mouse, touchscreens, and/or other input devices, to enter an input indicating the request 102 to the system 100. The request 102 can also be received through network communication, wireless communication, RF (radio frequency) communication, dedicated short-range communication (DSRC), etc. The request 102 may be a request to generate a code 104, where the code 104 may be a unique security code that can be used for various applications (described below). In some examples, the device 110 can receive the request 102 from a user of the system 100, a device external to the device 110, and/or from an application being executed or implemented by the system 100. For example, a user can use an encryption application being executed by the system 100 to encrypt a piece of information, and the encryption application may send the request 102 to the device 110 to generate the code 104, where the code 104 is used to encrypt the piece of information.

The device 110 may include or provide one or more circuitry or circuits, such as a plurality of cells 120. In some examples, the cells 120 may be memory cells. The cells 120 can be arranged in an array including a plurality of rows and columns, such as i rows and j columns. The cells 120 may include respective transistors, such as each cell among the cells 120 can include a transistor. The transistors in the cells 120 can be vertical field effective transistors (VFETs), and is labeled as VFET 122 in FIG. 1. A VFET 122 includes three terminals: the gate, the drain, and the source. As mentioned above, the drain is located at one end of a semiconductor pillar and the source is located at another end of the semiconductor pillar. The positions of the drain and source are interchangeable, and further details of the layouts of the three terminals will be described below. In an example, a VFET can operate in a forward mode when current is flowing from the drain to the source, such that the current in the forward mode is labeled as $I_F$. A VFET can operate in a reverse mode when current is flowing from the source to the drain, such that the current in the reverse mode is labeled as $I_R$. However, it is noted that the definitions of the forward mode and reverse mode are arbitrary. For example, in some applications, a VFET can operate in the forward mode when current flows from source to drain, and can operate in the reverse mode when current flows from drain to source.

In response to receiving the request 102, the device 110 can generate the code 104 using the VFETs among the plurality of cells 120. In an example, the request 102 can be a request for a code with a length of, for example, 3 bits. The device 110 can randomly select three cells from cells 120, such as cells positioned at (1, 1), (1, 2), and (2, 2). In another example, the request 102 may include a set of addresses of three particular cells such that the device 110 may select the three cells from the set of addresses. For example, the request 102 can include addresses (1, 1), (1, 2), and (2, 2). The device 110 (or a current sensing circuit) may measure or determine the currents $I_F$ and $I_R$ of the VFETs in the selected cells. The device 110 can determine a set of differences between the measures $I_F$'s and $I_R$'s. For example, the device 110 may determine a first difference between $I_{F(1,1)}$ and $I_{R(1,1)}$, a second difference between $I_{F(1,2)}$ and $I_{R(1,2)}$, a third difference between $I_{F(2,2)}$ and $I_{R(2,2)}$. The device 110 can transform the determined differences to bit values (binary value '0' or '1'), and output the bit values as a bit stream representing the code 104. For example, the device 110 may transform the first difference associated with cell (1,1) to a bit value of 1, the second difference associated with cell (1,2) to a bit value of 1, and the third difference associated with cell (2,2) to a bit value of 0. Thus, the code 104 being outputted can be "110". In some examples, the device 110 may perform other operations on the bit values prior to outputting the code 104, such as shuffling, shifting, and/or perform other operations on the bit values and outputting the results as the code 104.

Figure 2:
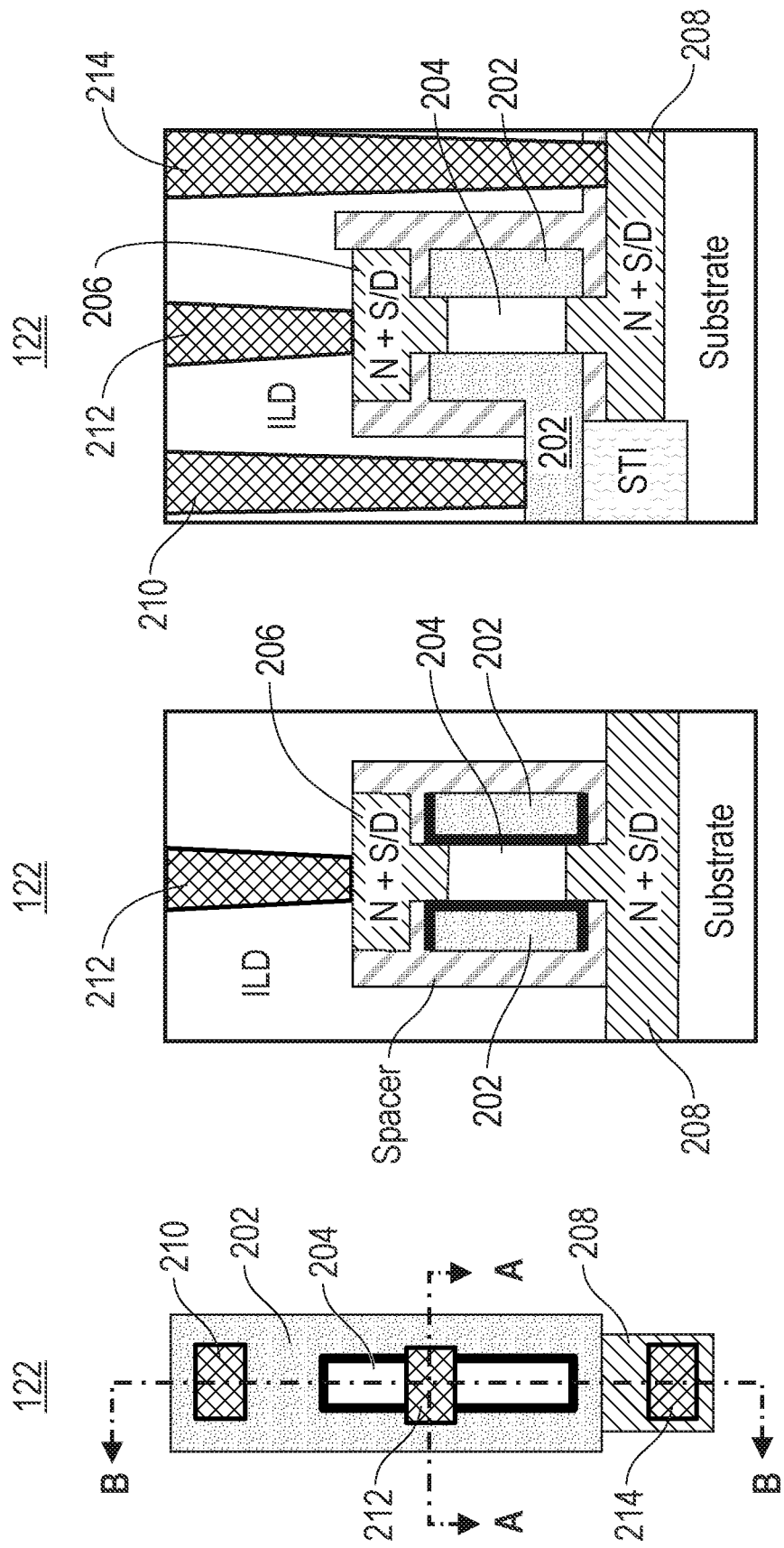
FIG. 2A is a diagram illustrating a top perspective view of an example layout of a VFET in one embodiment.
FIG. 2B is a diagram illustrating a cross section of an example layout of a VFET in one embodiment.
FIG. 2C is a diagram illustrating a cross section of an example layout of a VFET in one embodiment.

FIG. 2A is a diagram illustrating a top perspective view of an example layout of a VFET 122 in one embodiment of the present application. FIG. 2B is a diagram illustrating a cross section (A-A) of an example layout of a VFET 122 in one embodiment of the present application. FIG. 2C is a diagram illustrating a cross section (B-B) of an example layout of a VFET 122 in one embodiment of the present application. As shown in FIGS. 2A, 2B and 2C, the VFET 122 includes a top drain 206 and a bottom source 208 that are located at opposing ends of a semiconductor pillar (or fin) 204. It is noted that a VFET may also include a top source and a bottom drain arranged in a similar manner as the layouts presented in FIGS. 2A, 2B, and 2C. For example, focusing on the cross sections of the VFET 122 shown in FIGS. 2B and 2C, the drain can be located at the bottom (replacing bottom source 208), and the source can be located at the top (replacing top drain 206).

Focusing on the top perspective view of the VFET 122 shown in FIG. 2A, a gate 202 (gate terminal 202) is formed around the semiconductor pillar (or fin) 204. A gate contact 210 is located on top of the gate 202 to connect the gate 202 with an external component or circuit. A contact 212 is also visible in the top perspective view, where the contact 212 is located on top of the top drain 206 (as shown in FIGS. 2B and 2C). The contact 212 connects the top drain 206 with an external component or circuit. A contact 214 is located on top of the bottom source 208 (as shown in FIG. 2C). The contact 214 connects the bottom source 208 with an external component or circuit. The bottom source 208 may be layered on top of a substrate that connects to an external component or circuit. The VFET 122 may further comprise other device structures such as isolations and spacers.

Figure 3:
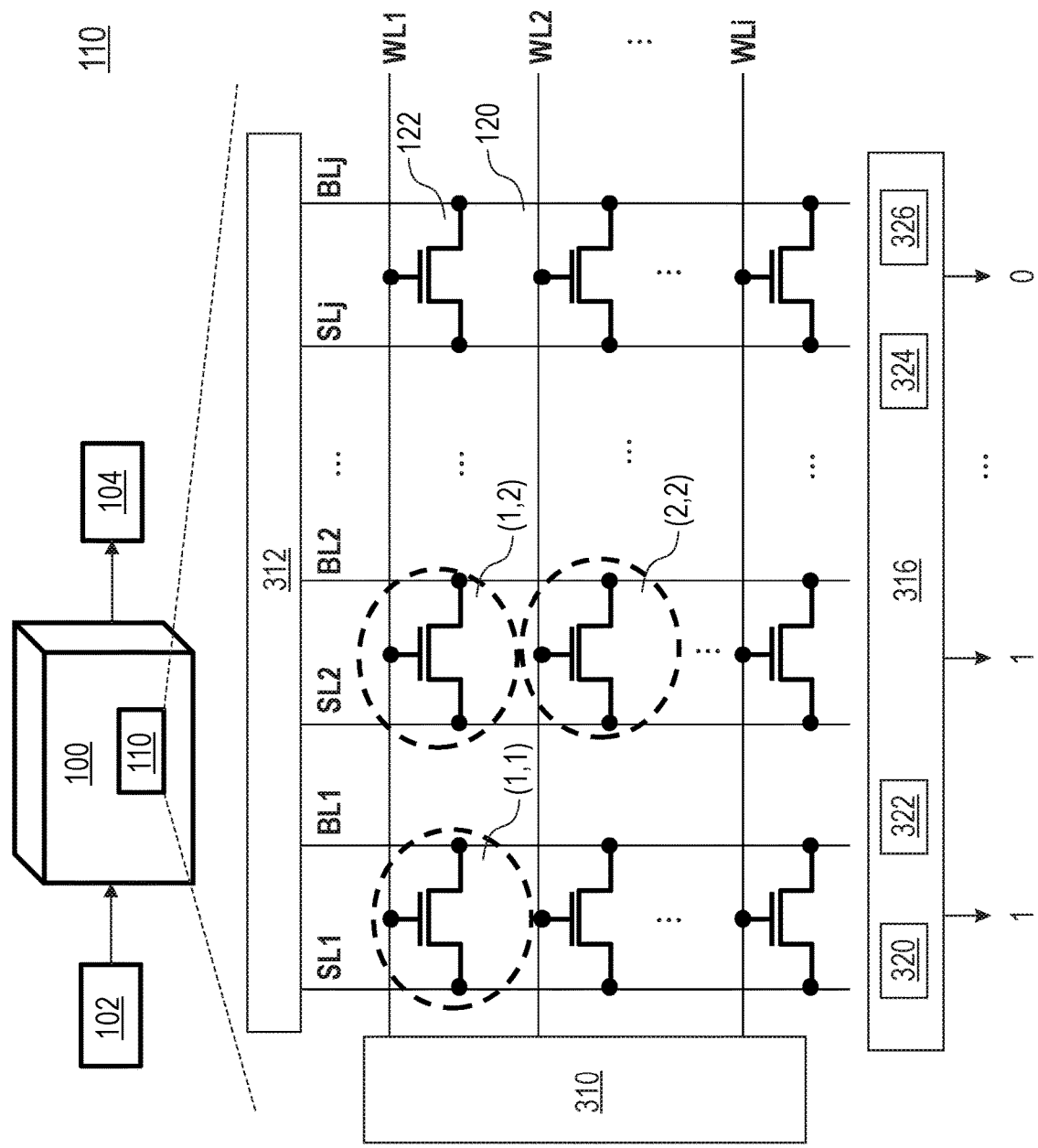
FIG. 3 is a diagram illustrating an example on-chip security circuit in one embodiment.

FIG. 3 is a diagram illustrating an example on-chip security circuit in one embodiment of the present application. The device 110 may include circuitry such as a row decoder 310, a column decoder 312, and a circuitry 316. The plurality of cells 120 and associated VFETs 122 are connected to the row decoder 310 via a plurality of word lines (WL). A WL may be a wire connecting the gate terminal of the VFETs 122 in the cells 120 to a voltage source residing in the device 110 and/or the system 100. The device 110 may include i WLs, corresponding to the i rows of cells 120. The plurality of cells 120 and associated VFETs 122 are also connected to the column decoder 312 via a plurality of source lines (SL) and bit lines (BL). A SL may be a wire connecting the bottom source or drain to external circuits or components, and a BL may be a wire connecting the top source or drain to external circuits or components. The device 110 may include j SLs and j BLs, corresponding to the j columns of cells 120.

In an example, the row decoder 310 may receive the request 102 activate one or more WLs according to the request 102. Similarly, the column decoder 312 may receive the request 102 and activate one or more SLs and BLs according to the request 102. For example, if request 102 indicates a selection of cells at (1, 1), (1, 2), and (2, 2), the row decoder 310 activates WL1 and WL2 sequentially, and the column decoder 312 activates SL1, BL1, and SL2, BL2 sequentially. The activation of the WLs can cause an application of a voltage to the gate terminal of the VFETs 122. For example, an activation of WL1 may cause a voltage to be applied to the gate terminals of VFETs in cells located at row i=1. The column decoder 312 can activate SL1 and BL1 to allow current to flow between the drain and source terminals of the VFETs in column j=1. Based on the activation of WL1, SL1, and BL1, the circuitry 316 or a current sensing circuit 320 can measure or determine the currents $I_F$ and $I_R$ associated with the VFET located in cell (1, 1). Note that when WL1 is activated, other WLs, such as WL2 to WLi, may be deactivated. Similarly, when SL1 and BL1 are activated, other SLs and BLs, such as SL2 to SLj and BL2 to BLj, may be deactivated.

In response to the determination of the currents $I_F$ and $I_R$ of the VFET located in cell (1, 1), the column decoder 312 can deactivate SL1 and BL1 and activate SL2 and BL2, and WL1 may remain activated. Thus, the circuitry 316 measures the currents $I_F$ and $I_R$ of the VFET located in cell (1, 2). In response to the determination of the currents $I_F$ and $I_R$ of VFETs in cells indicated by the request 102 and located in the row i=1, the row decoder 310 can deactivate the WL1 and may activate the WL2, which is the next WL among the selected cells indicated by the request 102 or randomly selected by the system 100 or the device 110. Note that other WL, SL, BL activation sequences and schemes are possible and the activation sequences and schemes may be dependent on a desired implementation of the system 100.

The determined currents $I_F$ and $I_R$ for the VFETS in the selected cells may be read by the circuitry 316. The circuitry 316 may include a subtractor circuit (subtractor 322) operable to determine a current difference (or difference) $D=I_F-I_R$ between the determined currents $I_F$ and $I_R$ of the VFETs in the selected cells. The circuitry 316 may further include a comparator circuit (comparator 324) operable to compare the determined differences with a stored value (described below) that may be stored in a memory device of the system 100 and/or the device 110. The circuitry 316 may further include an analog-to-digital (A/D) converter 326 operable to transform results of the comparison into bit values '0' or '1'. The circuitry 316 may output the bit values as a bit stream representing the code 104. The circuitry 316 may include additional components or circuits.

In an embodiment, the comparator of the circuitry 316 may compare the determined differences with zero (the stored value) to determine whether the determined differences are positive or negative valued (the zero-comparison embodiment). If a difference is greater than zero, the A/D converter may transform the difference to a bit value of '1'. If a difference is less than zero, the A/D converter may transform the difference to a bit value of '0'. Note that a difference being greater than zero implies that $I_F>I_R$, and a difference being less than zero implies that $I_F<I_R$. A presence of a difference between the currents $I_F$ and $I_R$ indicates a presence of asymmetry between the top drain or source of a VFET with the bottom drain or source of the VFET as a result of the separate fabrication process mentioned above.

In another embodiment, the comparator of the circuitry 316 may compare the determined differences with a threshold $I_0$ (the stored value) to determine a degree of asymmetry between the top drain or top source of a VFET with the bottom drain or bottom source of the VFET (the threshold-comparison embodiment). The value of $I_0$ is based on factors such as a size of the VFETs, the amount of noise in the drive current flowing through the cells, a sensitivity of a reader configure to read the cells 120, etc. If an absolute value of a difference is greater than the threshold $I_0$, the A/D converter may transform the difference to a bit value of '0'. If an absolute value of a difference is less than the threshold $I_0$, the A/D converter may transform the difference to a bit value of '1'. Note that the absolute value of a difference being greater than the threshold $I_0$ implies that the corresponding VFET is highly asymmetric. Similarly, the absolute value of a difference being less than the threshold $I_0$ implies that the corresponding VFET has relatively satisfying symmetry.

Figure 4A:
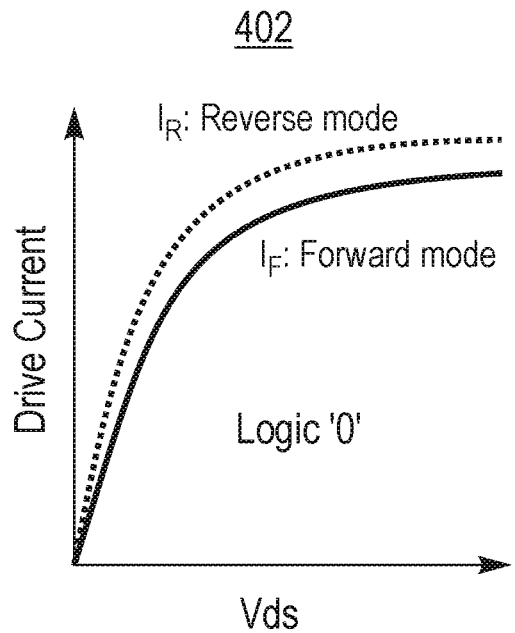
FIG. 4A illustrates a comparison between output characteristics of different configurations of an on-chip security circuit in one embodiment.
Figure 4B:
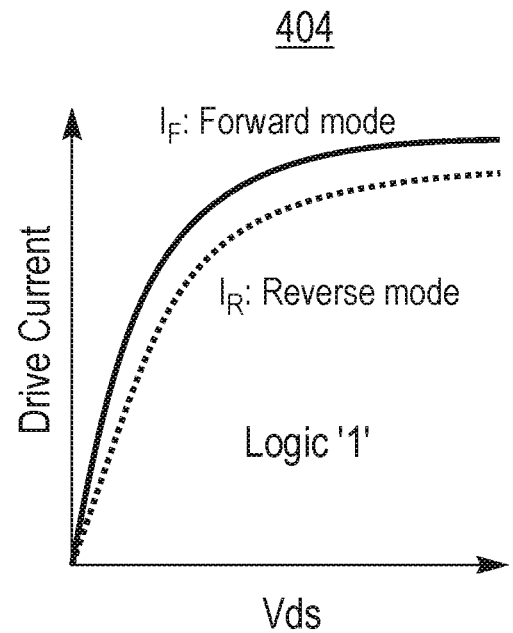
FIG. 4B illustrates a comparison between output characteristics of different configurations of an on-chip security circuit in one embodiment.
Figure 4C:
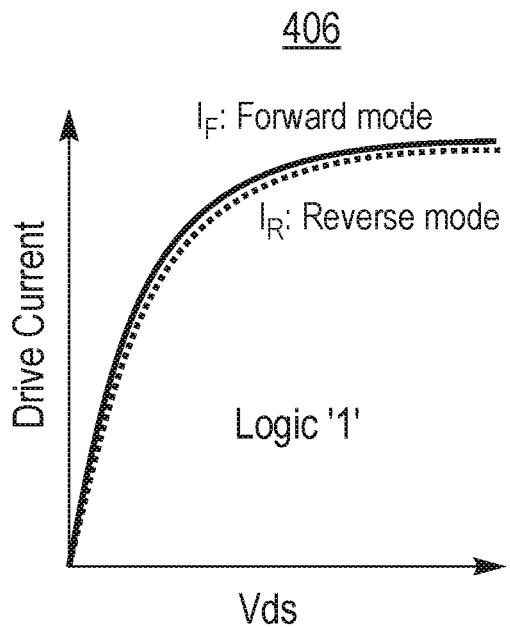
FIG. 4C illustrates a comparison between output characteristics of different configurations of an on-chip security circuit in one embodiment.

FIGS. 4A, 4B, and 4C each illustrates a comparison between output characteristics of different configurations of an on-chip security circuit in one embodiment and in accordance with the present application. The plots 402, 404, 406 shown in FIGS. 4A, 4B, 4C, respectively, each represents plots of drive current vs. source/drain voltage $V_{ds}$ of a VFET. The plot 402 represents the drive current vs. $V_{ds}$ of a VFET with a higher resistance on the source side. When a VFET has a higher resistance on the source side, the current $I_R$ is greater than $I_F$ and thus, the determined difference of such a VFET will be transformed to a bit value of '0'. The plot 404 represents the drive current vs. $V_{ds}$ of a VFET with a higher resistance on the drain side. When a VFET has a higher resistance on the drain side, the current $I_F$ is greater than $I_R$ and thus, the determined difference of such a VFET will be transformed to a bit value of '1'. The plots 402, 404 may also represent a VFET that is highly asymmetric. In an example, an increase in the difference or distance between the $I_R$ and $I_F$ curves in the plots 402, 404 indicates a higher degree of asymmetry. The plot 406 represents a VFET that has higher symmetry, such that the currents $I_R$ and $I_F$ are not too different from each other.

Figure 5:
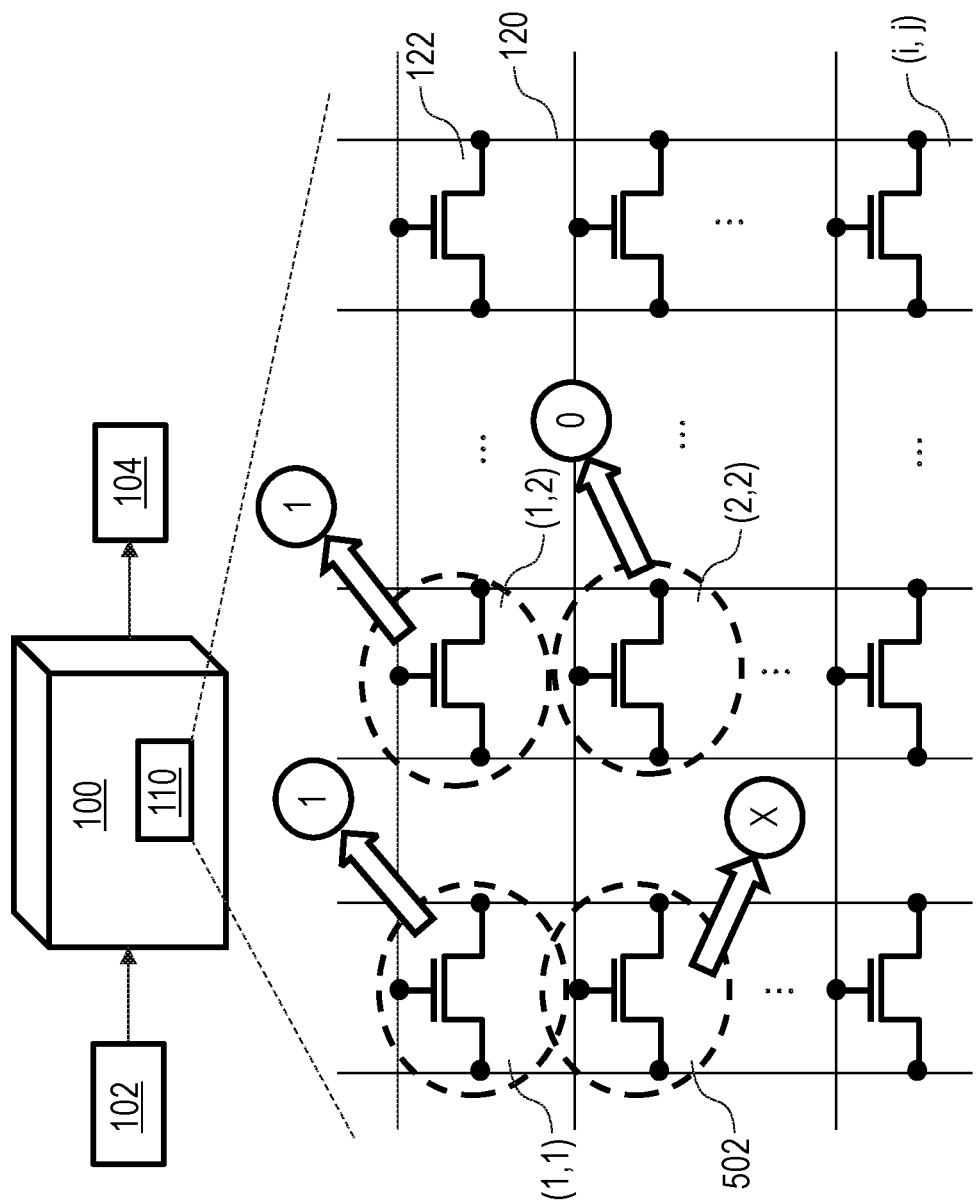
FIG. 5 is a diagram illustrating an example on-chip security circuit in one embodiment.

FIG. 5 is a diagram illustrating an example on-chip security circuit in one embodiment and in accordance with the present application. In an example embodiment, the plurality of cells 120 may include cells with a VFET that is symmetric or has relatively good symmetry. During a manufacturing phase of the device 110, the manufacturing process may include determining which cells 120 include symmetric VFET or relatively symmetric and label these cells as dummy or symmetric cells. For example, the manufacturing process may determine which cells 120 includes VFETS with a current difference D that is less than threshold $I_0$, and may label these cells as symmetric cells. Therefore, a portion of the cells 120 among the device 110 can be symmetric cells.

Figure 6A:
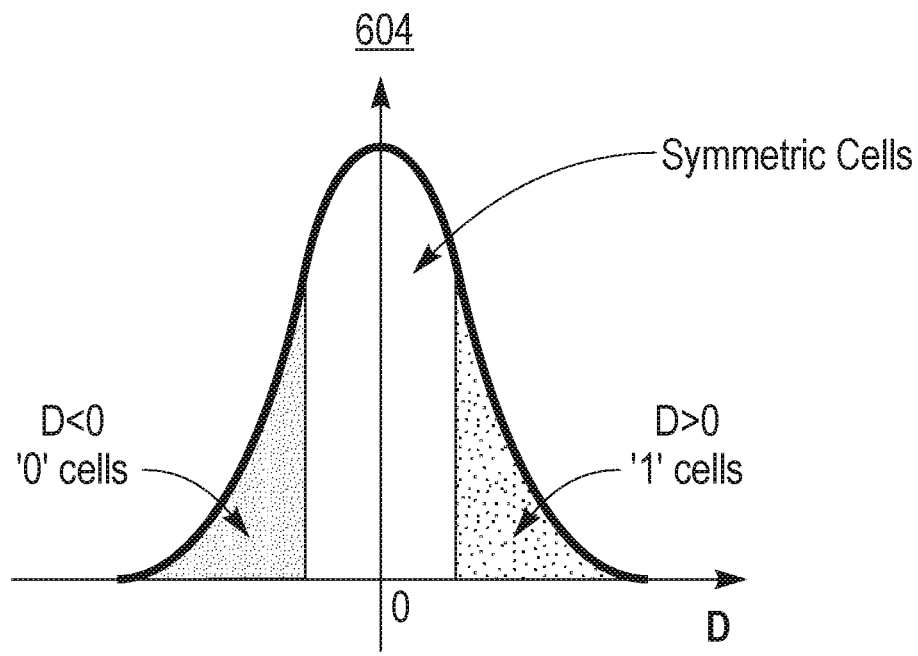
FIG. 6A illustrates an example distribution of a voltage difference in accordance with an example configuration of an on-chip security circuit in one embodiment.

FIG. 6A illustrates an example distribution of a current difference in accordance with an example configuration of an on-chip security circuit in one embodiment of the present application. The descriptions of FIG. 6A below may reference at least some of the components shown in FIG. 1-5. In the embodiment where the current difference D is being compared to zero (the zero-comparison embodiment), since a current difference of a symmetric cell can be zero, the device 110 may avoid using symmetric cells to generate the code 104. An example distribution 604 is shown in FIG. 6A, where the distribution 604 represents a distribution of the current difference D among a plurality of cells 120 of device 110 under the zero-comparison embodiment. In distribution 604, the ratio of symmetric cells to asymmetric cells is relatively high (unshaded portion being the symmetric cells). Thus, a relative high number of cells are symmetric and may not be useable in the zero-comparison embodiment. Note that even though some symmetric cells can include VFETs with a current difference not equal to zero, meaning they can still be assigned to '0' or '1', these symmetric cells may not be used by the device 110 in this embodiment due to the manufacturing phase already labeled them as symmetric cells.

An increase in the number of symmetric cells leads to a decrease in the number of cells that can output a '0' or '1' in the zero comparison embodiment. Thus, during the manufacturing phase, it may be determined whether the device 110 shall be configured to operate the zero-comparison embodiment or not. If a ratio of symmetric cells to asymmetric cells is relatively low, for example, 5%, 10%, under 20%, etc., then the device 110 may be configured to operate under the zero-comparison embodiment, or both the zero-comparison embodiment and the threshold-comparison embodiment. Otherwise, the device 110 may be configured to operate under the threshold-comparison embodiment.

Figure 6B:
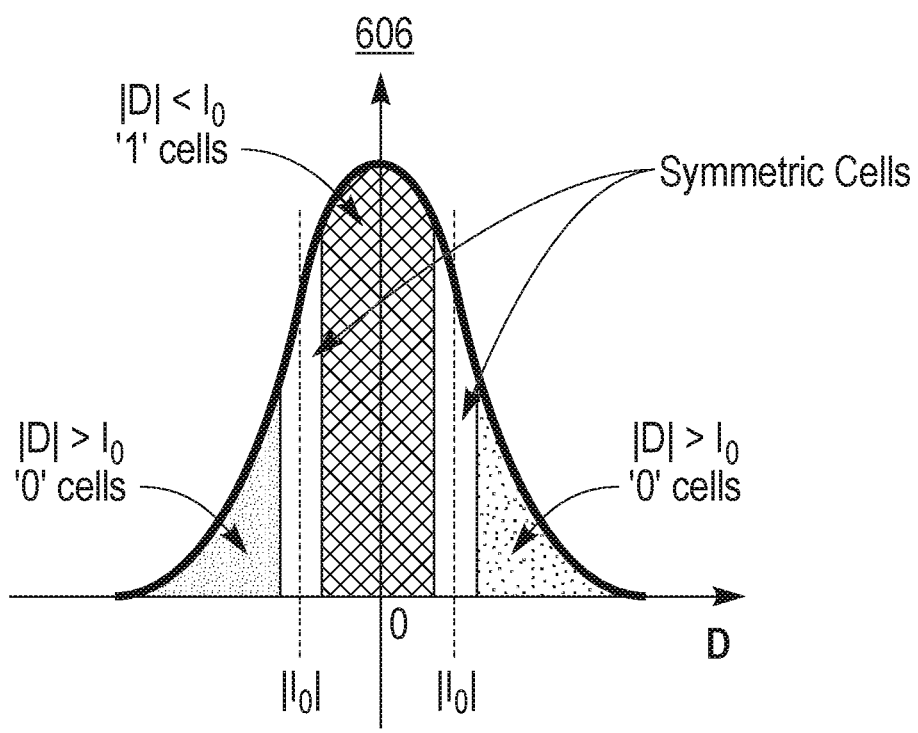
FIG. 6B illustrates an example distribution of a voltage difference in accordance with an example configuration of an on-chip security circuit in one embodiment.

FIG. 6B illustrates an example distribution of a voltage difference in accordance with an example configuration of an on-chip security circuit in one embodiment of the present application. The descriptions of FIG. 6B below may reference at least some of the components shown in FIG. 1-5. A distribution 606 shown in FIG. 6B, the distribution 606 represents the current difference D among a plurality of cells 120 of device 110 under the threshold-comparison embodiment. As shown in distribution 606, even though the number of symmetric cells is substantially the same as the number of symmetric cells in distribution 604, a majority of these symmetric cells can be used to output a bit value of '1' under the threshold-comparison embodiment. Thus, threshold-comparison embodiment may utilize more cells than the zero-comparison embodiment.

In an example, a ratio of symmetric cells to asymmetric cells among the device 110 may be, for example, 1:10, such that 10% of the cells 120 are symmetric cells. If the request 102 is a request to generate an advanced encryption standard (AES) key of a length of 256 bits, the device 110 may select at least 10% more than 256 cells, such as 282 cells, to account for potentially selecting a symmetric cell. If more than 256 asymmetric cells, such as 260 asymmetric cells are selected (meaning 22 symmetric cells are among the selected 282 cells), the device 110 may generate the code 104 based on bits transformed from current differences corresponding to any of the 256 cells out of the 260 cells. For example, the generated code 104 with any number of bits, preferably greater than 256 bits, can be used as the seed for a hash generator, such as secure hash algorithm 256 (SHA-256) to output a 256-bit security code. It noted that additional cells may be selected depending on a desired implementation. For example, to maintain an efficiency of the code generation, the device 110 may select 10% more than the requested length of the code. However, if efficiency is not a concern and a user of the request 102 would like to guarantee selection of asymmetric cells, the device 110 may select, for example, 20% more than the requested length of the code. The device 110 may use either the zero-comparison embodiment or the threshold-comparison embodiment to generate the code 104 using the selected cells.

The code 104 outputted from the device 110 may be used for various applications. For example, the code 104 may be a cryptographic key, an authentication code, a temporary access code or password, an input to a hash function, etc. In an example, the cells 120 of the device 110 may be components of the system 100 such that the generation of the code 104 may be performed using existing components. In some examples, the system 100 may lack VFETs and the device 110 may be a chip manufactured separately, and the device 110 can be embedded or integrated into hardware of the system 100 such that the system 100 can use the device 110 to generate the code 104. The asymmetric nature of the VFETs results from the manufacturing phase, such that the level of asymmetry and whether which cell will output a '0' or '1' will be unknown to a user of the system 100. Further, a feature to randomly select the cells to generate the code 104 adds a layer of security to the generated code 104 since the user will not know which cells will be selected to generate the code. Furthermore, each input or request for code generation will result in a new unique code.

Figure 7:
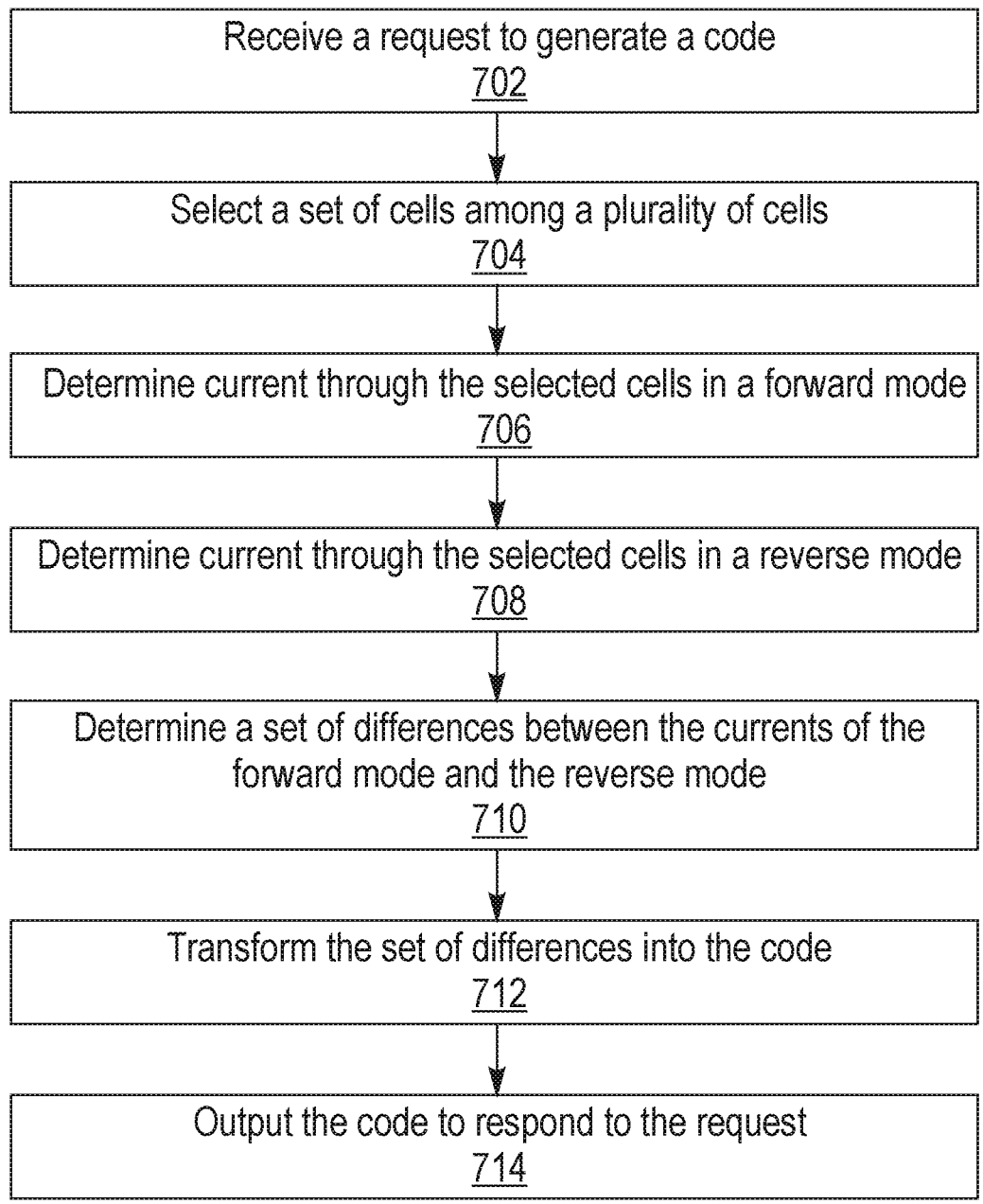
FIG. 7 is a flow diagram illustrating a process that can be implemented by an on-chip security circuit in one embodiment.

FIG. 7 is a flow diagram illustrating a process that can be implemented by an on-chip security circuit in one embodiment. An example process may include one or more operations, actions, or functions as illustrated by one or more of blocks 702, 704, 706, 708, 710, 712, and/or 714. Although illustrated as discrete blocks, various blocks may be divided into additional blocks, combined into fewer blocks, eliminated, or performed in parallel, depending on the desired implementation.

Processing begins at block 702, where a device receives a request to generate a code. Processing can continue from block 702 to block 704, where the device selects a set of cells among a plurality of cells. Processing can continue from block 704 to block 706, where the device determines current through the selected cells in a forward mode. Processing can continue from block 706 to block 708, where the device determines current through the selected cells in a reverse mode. Processing can continue from block 708 to block 712, where the device determines a set of differences between the currents of the forward mode and the reverse mode. Processing can continue from block 708 to block 710, where the device transforms the set of differences into the code. Processing can continue from block 710 to block 712, where the device outputs the code to respond to the request.

Figure 8:
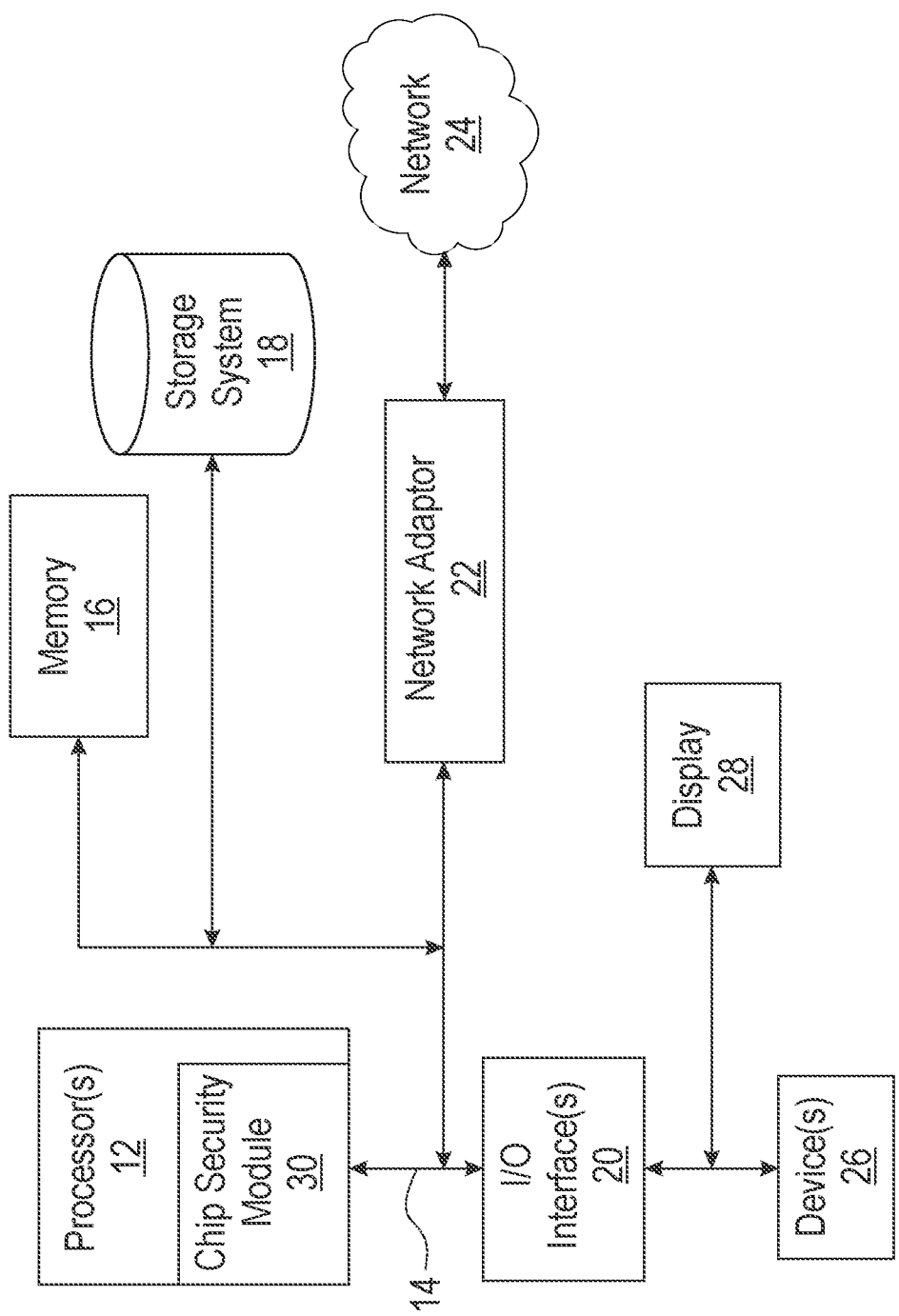
FIG. 8 illustrates a schematic of an example computer or processing system that may implement an on-chip security circuit in one embodiment.

FIG. 8 illustrates a schematic of an example computer or processing system that may implement an on-chip security circuit in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., chip security module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A device comprising:
a plurality of cells;
a set of decoders coupled to the plurality of cells, the set of decoders being operable to select a set of cells among the plurality of cells;
a circuitry coupled to the plurality of cells, the circuitry being operable to:
determine current through the selected cells in a forward mode;
determine current through the selected cells in a reverse mode;

determine a set of differences between the currents of the forward mode and the reverse mode, wherein the set of differences corresponds to the set of selected cells;
transform the set of differences into a set of bit values; and
output the set of bit values as a bit stream.

2. The device of claim 1, wherein the selection of the cells is based on a request that include a set of addresses of the set of cells.

3. The device of claim 1, wherein the selection of the cells is a random selection.

4. The device of claim 1, wherein each cell includes a vertical field effect transistor.

5. The device of claim 1, wherein the circuitry is operable to:
in response to a difference being less than zero, transform the difference to a bit value of zero;
in response to the difference being greater than zero, transform the difference to a bit value of one.

6. The device of claim 1, wherein the circuitry is operable to:
compare an absolute value of a difference with a threshold;
in response to the absolute value of the difference being less than the threshold, transform the difference to a bit value of one;
in response to the absolute value of the difference being greater than the threshold, transform the difference to a bit value of zero.

7. The device of claim 1, wherein the set of selected cells comprises a number of cells and the number is a length of the code.

8. The device of claim 1, wherein the set of selected cells comprises a number of cells, the number is greater than a length of the code, and the difference between the number and the length of the code is based on a ratio between symmetric cells and asymmetric cells among the plurality of cells.

9. A system comprising:
a processor being configured to receive a request to generate a code;
a device configured to be in communication with the processor, the device comprising:
a plurality of cells;
a set of decoders coupled to the plurality of cells, the set of decoders being operable to select a set of cells among the plurality of cells;
a circuitry coupled to the plurality of cells, the circuitry being operable to:
determine current through the selected cells in a forward mode;
determine current through the selected cells in a reverse mode;
determine a set of differences between the currents of the forward mode and the reverse mode, wherein the set of differences corresponds to the set of selected cells;
transform the set of differences into the code; and
output the code to the processor.

10. The system of claim 9, wherein each cell includes a vertical field effect transistor.

11. The system of claim 9, wherein the device is embedded in the processor.

12. A method comprising:
receiving, by a device, a request to generate a code;
selecting, by the device, a set of cells among a plurality of cells;
determining, by the device, current through the selected cells in a forward mode;
determining, by the device, current through the selected cells in a reverse mode;
determining, by the device, a set of differences between the currents of the forward mode and the reverse mode, wherein the set of differences corresponds to the set of selected cells;
transforming, by the device, the set of differences into the code; and
outputting, by the device, the code to respond to the request.

13. The method of claim 12, wherein the request includes a set of addresses of the set of cells.

14. The method of claim 12, wherein selecting, by the device, the set of cells comprises randomly selecting, by the device, the set of cells.

15. The method of claim 12, wherein each cell include a vertical field effect transistor.

16. The method of claim 12, wherein transforming, by the device, the set of differences into the code comprises:
in response to a difference being less than zero, transforming, by the device, the difference to a bit value of zero;
in response to the difference being greater than zero, transforming, by the device, the difference to a bit value of one; and
aggregating, by the device, the transformed bit values to generate the code.

17. The method of claim 12, wherein transforming, by the device, the set of differences into the code comprises:
comparing, by the device, an absolute value of a difference with a threshold;
in response to the absolute value of the difference being less than the threshold, transforming, by the device, the difference to a bit value of one;
in response to the absolute value of the difference being greater than the threshold, transforming, by the device, the difference to a bit value of zero; and
aggregating, by the device, the transformed bit values to generate the code.

18. The method of claim 12, wherein the request indicates a length of the code, and selecting, by the device, the set of cells comprises selecting, by the device, a number of cells, wherein the number is based on the length indicated by the request.

19. The method of claim 12, wherein the received selection indicates a length of the code, and the method further comprising:
identifying, by the device, a ratio between symmetric cells and asymmetric cells among the plurality of cells; and
determining, by the device and based on the ratio and based on the length of the code, a number of cells to be selected to generate the code, wherein selecting the set of cells comprises selecting the number of cells.

20. The method of claim 12, further comprising:
receiving, by the device, a new request to generate a new code;
selecting, by the device, a new set of cells among the plurality of cells;
determining, by the device, current through the new selected cells in a forward mode;
determining, by the device, current through the new selected cells in a reverse mode;

determining, by the device, a new set of differences between the currents of the forward mode and the reverse mode of the new selected cells;

transforming, by the device, the new set of differences into the new code; and outputting, by the device, the new code to fulfill the new request.

\* \* \* \* \*